Sept. 30, 1958 L. W. BILDERBACK Re. 24,543

FITTING CLOSURE

Original Filed June 3, 1955 2 Sheets-Sheet 1

INVENTOR:
LAVERNE W. BILDERBACK,
BY Kingsland, Rogers & Eyell
ATTORNEYS

FITTING CLOSURE

Original Filed June 3, 1955 2 Sheets-Sheet 2

INVENTOR:
LAVERNE W. BILDERBACK,
BY Kingsland, Rogers & Ezell
ATTORNEYS

United States Patent Office

Re. 24,543
Reissued Sept. 30, 1958

24,543

FITTING CLOSURE

Laverne W. Bilderback, Caseyville, Ill., assignor, by mesne assignments, to ACF Industries, Incorporated, a corporation of New Jersey Original No. 2,785,829, dated March 19, 1957, Serial No. 512,949, June 3, 1955. Application for reissue March 13, 1958, Serial No. 733,220

3 Claims. (Cl. 220—40)

Matter enclosed in heavy brackets [ ] appears in the original patent but forms no part of this reissue specification; matter printed in italics indicates the additions made by reissue.

The present invention relates generally to sealing devices, and more particularly to a novel closure for pipe fittings and the like.

Briefly, the invention is directed to an improved arrangement for closing access apertures in pipe fittings or like enclosures adapted to contain fluids under pressure. The invention contemplates that the body of the fittings be provided with an integral skirt-like projection extending axially beyond the aperture and having lugs for interlocking engagement with a ring-like holding member also provided with lugs. The holding member has internal threads which receive a hollow screw having a hexagonally-shaped end portion for receiving a wrench. A tapered plug shaped to fit the aperture has an axial stem which is accommodated within the hollow screw. A thrust ring having spherical centering faces is interposed between the lower end of the screw and the portion of the plug adjacent the lower end of the stem.

It is an object of the present invention to provide a novel fitting closure by means of which an access aperture may be quickly and easily closed or opened without danger of a blow-off.

It is another object of the invention to provide a novel fitting closure which incorporates threaded tightening means, but which requires a minimum amount of wrenching to tighten or loosen the threads.

It is another object of the invention to provide a novel fitting closure in which machined surfaces most susceptible to damage are largely eliminated from the body of the fitting and incorporated in less expensive replaceable accessory parts.

The foregoing, along with additional objects and advantages, will be apparent from the following description of a specific embodiment of the invention, the description being taken in conjunction with the accompanying drawings, in which.

Figure 1:
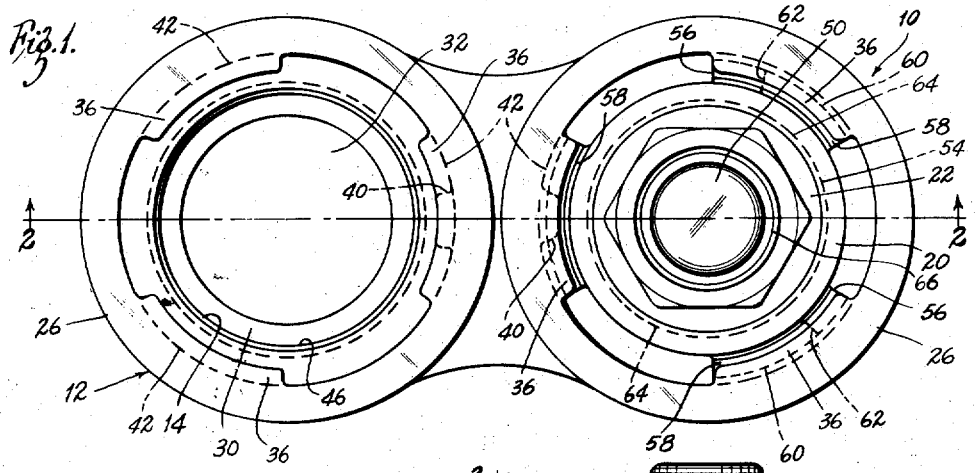
Figure 1 is a top plan view of a pipe fitting having twin access apertures, one of which is open and the other of which is closed in accordance with the teachings of the present invention.

Referring more particularly to the drawings by means of the reference characters placed thereon, the numeral 10 designates generally a return bend pipe fitting which incorporates a closure conforming to the teachings of the present invention. The fitting 10 comprises a body 12 provided with twin apertures 14 and 16. As is clear from Figures 1 and 2, the aperture 14 is shown open, while the aperture 16 is sealed by means of a plug 18 retained in place through the cooperative action of a holding member 20, a screw 22, and a thrust ring 24, as will be described hereinafter.

The fitting 12 comprises a body having twin barrels 26 each having a tube hole 28 for receiving a tube 30. The tubes 30 are rolled into the openings 28 in conventional manner and communicate with each other through a chamber 32 defined within the conjoined barrels 26.

The apertures 14 and 16 are each located on an axis of one of the tube holes 28, and each of the barrels 26 is provided with a skirt-like extension 34 extending axially beyond the aperture 14 or 16 therein. Directing attention particularly to the portion 34 associated with the aperture 14 and illustrated on the left in Figures 1 and 2, it will be observed that the portion 34 is provided with three inwardly extending lugs 36 spaced equidistantly around the inside of the portion 34, the three lugs having coplanar undercut bearing surfaces 38 normal to the axis of the aperture. Each skirt portion 34 is also provided with one locating lug 40 shaped as clearly shown in Figures 1 and 2 of the drawings. These locating lugs 40 are formed immediately adjacent the respective apertures 14 and 16 so as to leave spaces 42 between the locating lugs 40 and the particular lugs 38 immediately thereabove.

The apertures 14 and 16 are preferably of identical shape, each being defined primarily by a concave conical surface 44 which converges toward the interior of the body 12. The inner edges of the apertures may be relieved, as at 46 to avoid leaving a sharp or rough edge.

Figure 2:
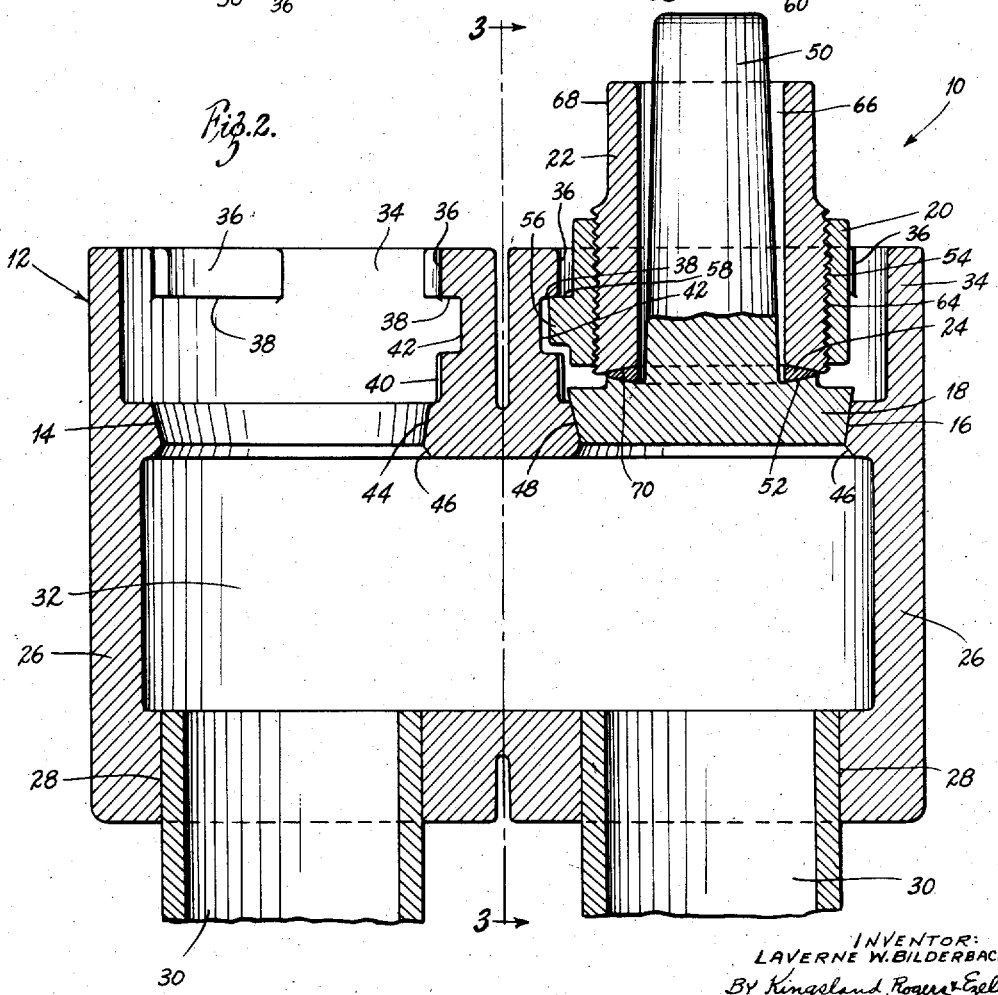
Figure 2 is a sectional view taken generally along the line 2—2 of Figure 1.
Figure 3:
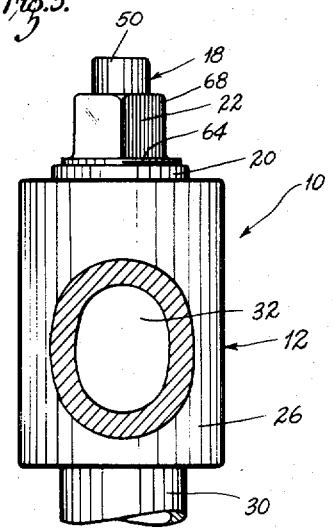
Figure 3 is a reduced sectional view taken generally along the line 3—3 of Figure 2.
Figure 4:
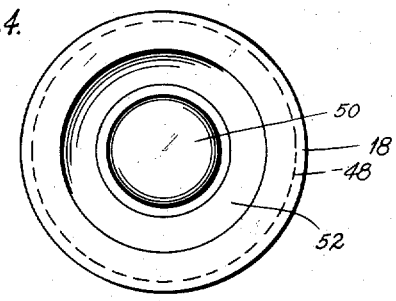
Figure 4 is a top view of a plug.
Figure 5:
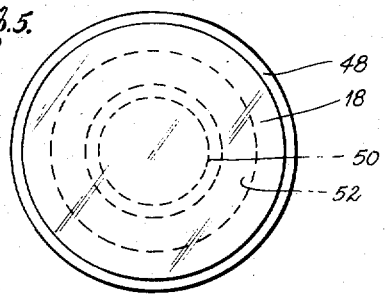
Figure 5 is a bottom view thereof.

Identical plugs 18 are provided for the apertures 14 and 16. A preferred shape is clearly illustrated in Figures 2, 4 and 5, from which it will be noted that the plugs 18 are provided with convex conical surfaces 48 which interfit with the concave conical surfaces 44 formed in the body 12. Each plug 18 has an external axial stem 50. Adjacent the base of each stem 50 there is formed an annular seat 52 having a concave spherical contour as shown in Figure 2.

Figure 7:
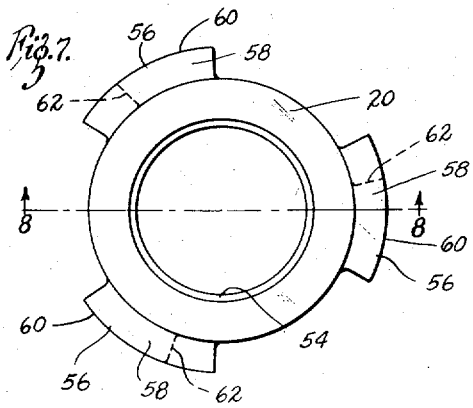
Figure 7 is a top view of a holding member.
Figure 6:
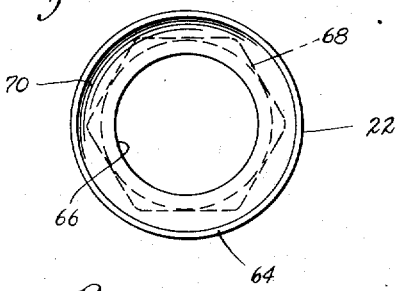
Figure 6 is a bottom view of a screw.
Figure 8:
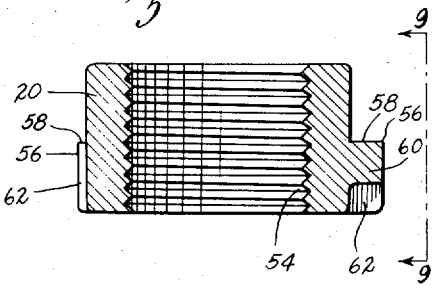
Figure 8 is a sectional view taken generally along the line 8—8 of Figure 7.
Figure 9:
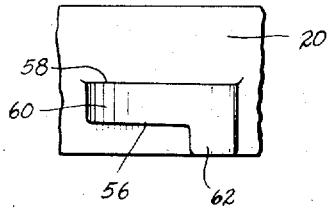
Figure 9 is a fragmentary elevation of the holding member taken from the position of the line 9—9 of Figure 8.

The holding member 20, shown removed in Figures 7 and 8, is generally ring-shaped and has internal threads 54. It is also provided with three exterior lugs 56 spaced equidistantly therearound and having coplanar upper bearing surfaces 58 for engagement with the surfaces 38 of the aforementioned lugs 36. Each lug 56 includes a peripherally elongated retaining portion 60 having a depth which is less than the vertical depth of the space 42 above the previously mentioned locating lug 40 in the body 12, and each lug 56 also has a depending stop portion 62, any of which may engage the locating lug 40.

The screw 22 is provided with external threads 64 engageable with the aforementioned threads 54 of the holding member 20. The screw 22 is formed with an internal bore 66 extending completely therethrough for accommodation of the stem 50 of the plug 18. The upper end of the screw 22 is provided with a hexagonal extension 68 for wrenching purposes, and the lower end is formed to provide an annular seat 70 having a spherical contour generally similar to that of the previously described seat 52. It will be observed that the seat 52 on the plug 18 and the seat 70 on the screw 22 have the annular thrust ring 24 interposed between them, and that the latter is provided with opposed spherical surfaces for mating and centering engagement with the parts 18 and 22.

The manner of using the present invention is generally apparent from the drawings. Normally, the plug 18 is first inserted into the appropriate aperture and the thrust ring 24 is slipped on over the stem 50. The screw 22 and the holding member 20 may be initially engaged by hand and handled as an assembly in slipping them over the stem 50 and into the skirt portion 34. The lugs 56 of the holding member 20 pass between the lugs 36 of the body 12 and a simple 60° twist of the holding member 20 is sufficient to dispose the stop portion 62 of one of the lugs 56 against the locating lug 40, whereupon each of the surfaces 58 of the lugs 56 will be opposed by a bearing surface 38 of a lug 36. The screw 22 may then be turned by hand until the surfaces 38 and 58 are snugly interlockingly engaged, and finally a wrench may be used on the hexagonal extension 68 to seat the plug 18 as firmly as desired within its associated aperture.

It will be noted that the extension of the stem 50 of the plug 18 through the bore 66 of the screw 22 maintains general alignment of the plug 18 as the closure is being effected, and that final uniform seating pressure around the periphery of the plug 18 is assured through the centering action of the thrust ring 24 interposed between the spherically formed annular seats 52 and 70.

It is obvious that the above described operation for closing the apertures 14 and 16 may be effected with a minimum time and effort. It is equally obvious that the time required for reopening the apertures 14 and 16 will also be a minimum when these operations are reversed.

Clearly, there has been described and illustrated a fitting closure which fulfills the objects and advantages sought therefor.

It is to be understood that the foregoing description and the accompanying drawings have been given only by way of illustration and example. It will be further understood that rearrangement of parts, the substitution of equivalent elements, or changes in the form of the parts, all of which will be obvious to those skilled in the pertinent art, is considered to be within the scope of the present invention which is limited only by the claims which follow.

What is claimed is:

1. In a closure for a pressure fitting, or the like, the combination of a fitting provided with a tapered aperture therein and having an external skirt portion extending coaxially beyond said aperture, said skirt being formed with spaced projections about its internal periphery, a tapered plug for closing said aperture, said plug having an annular upper thrust receiving surface and being of less diameter than the internal diameter defined by the spaced projections to permit its passage therethrough, said plug also having an integral axial stem extending well beyond said skirt portion to facilitate loosening and removing the plug, and means through which said stem extends including interengaged threaded members removably disposed, at least in part, within said skirt portion for seating and retaining the plug in closing relation to the aperture, said threadedly interengaged members comprising an *internally threaded* ring-like holding member having external projections for engaging and interlocking with said internal *skirt portion* projections for removably retaining the holding member within the skirt, and [having internal threads, and a tubular screw having mating external threads mating with said internal threads,] *an externally threaded tubular screw member threadedly mating with said ring-like holding member,* said tubular screw *member* having an annular thrust engaging surface [substantially engaging] *facing* said annular thrust receiving surface of the plug, [whereby the tubular screw may be axially threaded through the ring-like holding member toward the plug disposed in the aperture to seat the plug in the aperture.] *and a substantially non-deformable thrust and centering ring between the thrust surfaces of said screw member and plug, rotation of said screw member in one axial direction engaging the bearing ring between the thrust surfaces of said screw member and plug in axial alignment and seating the plug in the fitting aperture.*

[2. The combination of claim 1 wherein the holding member and the skirt portion are also provided with mutually engageable elements effective to prevent turning of the holding member beyond an interlocked position within the skirt portion when the screw is screwed toward the aperture.]

[3. The combination of claim 1 wherein a thrust ring is interposed between one end of the tubular screw and the annular thrust receiving surface of the plug, said thrust ring having spherical contact surfaces on opposite sides thereof and said screw and plug each having an annular spherical surface in centering engagement with respective spherical surfaces on the thrust ring.]

*4. In a closure for a pressure fitting, or the like, the combination of a fitting provided with a tapered aperture therein and having an external skirt portion extending coaxially beyond said aperture, spaced projections extending inwardly from the skirt about its internal periphery, a locating lug extending inwardly from the skirt in axial spaced relation with the projections, a tapered plug for closing said aperture, said plug having an annular upper thrust receiving surface and being of less diameter than the internal diameter defined by the spaced projections to permit its passage therethrough, said plug also having an integral axial stem extending well beyond said skirt portion to facilitate loosening and removing the plug, and means through which said stem extends including members removably disposed, at least in part, within said skirt portion for seating and retaining the plug in closing relation to the aperture, said members comprising an internally threaded ring-like holding member having external projections for engaging and interlocking with said internal skirt portion projections for removably retaining the holding member within the skirt, an externally threaded tubular screw member having external threads mating with the internal thread of said holding member, said holding member having elements engaging with the skirt portion lug and projections effective to prevent turning of the holding member beyond interlocked position within the skirt portion when the screw member is screwed toward the aperture, said tubular screw member having an annular thrust engaging surface facing said annular thrust receiving surface of the plug, and a bearing ring between the thrust surfaces of said screw member and plug, rotation of said screw member in one axial direction engaging the ring between the thrust surfaces of said screw member and plug in axial alignment and seating the plug in the fitting aperture.*

*5. In a closure for a pressure fitting, or the like, the combination of a fitting provided with a tapered aperture therein and having an external skirt portion extending coaxially beyond said aperture, said skirt being formed with spaced projections about its internal periphery, a tapered plug for closing said aperture, said plug having an annular upper spherical thrust receiving surface at its larger diameter end and being of less diameter than the internal diameter defined by the spaced projections to permit its passage therethrough, said plug also having an integral axial stem extending well beyond said skirt portion to facilitate loosening and removing the plug, and means through which said stem extends including interengaged threaded members removably disposed, at least in part, within said skirt portion for seating and retaining the plug in closing relation to the aperture, said threadedly interengaged members comprising a ring-like internally threaded holding member having external projections for engaging and inter-locking with said internal skirt portion peripheral projections for removably retaining the holding member within the skirt, a tubular screw member having external threads mating with the internal threads of said holding member, said*

*tubular screw member having an annular spherical thrust engaging surface facing said annular spherical thrust receiving surface of the plug, and a bearing and centering ring between the thrust surfaces of said screw member and plug, said thrust ring having spherical contact thrust surfaces on opposite ends thereof engaging with the respective adjacent spherical thrust surfaces on the plug and screw member, rotation of said screw member in one axial direction engaging the bearing ring between the thrust surfaces of said screw member and plug in axial alignment with and seating the plug in the fitting aperture.*

References Cited in the file of this patent
or the original patent

UNITED STATES PATENTS

| | | |
|---|---|---|
| 1,515,661 | Cross | Nov. 18, 1924 |
| 1,647,321 | Thurstensen | Nov. 1, 1927 |
| 1,683,726 | Pierce | Sept. 11, 1928 |
| 1,992,793 | Welter | Feb. 26, 1935 |
| 2,358,814 | Larsen | Sept. 26, 1944 |